(12) United States Patent
Ozawa

(10) Patent No.: US 7,268,337 B2
(45) Date of Patent: Sep. 11, 2007

(54) OPTICAL SENSOR, OUTPUT PROCESSING METHOD OF OPTICAL SENSOR, DISPLAY DEVICE, AND ELECTRONIC APPARATUS

(75) Inventor: Tokuro Ozawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 30 days.

(21) Appl. No.: 11/103,461

(22) Filed: Apr. 12, 2005

(65) Prior Publication Data
US 2005/0269486 A1    Dec. 8, 2005

(30) Foreign Application Priority Data
Jun. 3, 2004    (JP) .............................. 2004-165779

(51) Int. Cl.
*G01J 1/44* (2006.01)
(52) U.S. Cl. .................. 250/214 R; 356/218
(58) Field of Classification Search ......... 250/214 AL, 250/214 SW, 214 DC; 356/218, 226, 229, 356/230
See application file for complete search history.

(56) References Cited

U.S. PATENT DOCUMENTS 4,556,789 A * 12/1985 Shotaro et al. ............. 250/206
5,192,968 A * 3/1993 Kishida et al. ............. 396/213
6,479,940 B1 * 11/2002 Ishizuka ................... 315/169.3

FOREIGN PATENT DOCUMENTS

| JP | 03170822 A | * | 7/1991 |
| JP | A 05-018820 | | 1/1993 |
| JP | A 09-082931 | | 3/1997 |
| JP | A 09210778 | | 8/1997 |
| JP | A 2002-176192 | | 6/2002 |

OTHER PUBLICATIONS

Brophy, James J., *Base Electronics for Scientists—4th Edition*, p. 247, Scientist Inc., 1986. (With partial English translation.).

* cited by examiner

*Primary Examiner*—Thanh X. Luu
*Assistant Examiner*—Stephen Yam
(74) *Attorney, Agent, or Firm*—Oliff & Berridge, PLC

(57) ABSTRACT

An optical sensor includes a light receiving element in which a current corresponding to the amount of received light flows between one end and the other end thereof, a comparator which compares a voltage at the one end of the light receiving element with a predetermined threshold voltage to output a logical signal based on the comparison result, an initialization circuit which initializes the voltage at the one end of the light receiving element to the threshold value or a voltage approximate to the threshold voltage before detecting the amount of the received light, and a voltage changing circuit which changes the voltage at the one end of the light receiving element by a predetermined voltage after completing the initialization. In the optical sensor, after changing the voltage by the voltage changing circuit, a period until the logical signal output from the comparator is logically inverted is expressed as a value corresponding to the amount of the received light.

11 Claims, 13 Drawing Sheets

<INITIALIZATION>

<SETTING>

<DETECTION>

FIG. 12

| | | S3 | S2 | S1 |
|---|---|---|---|---|
| SMALL AMOUNT OF LIGHT ↕ LARGE AMOUNT OF LIGHT | 1 | L | L | H |
| | 2 | L | H | L |
| | 3 | L | H | H |
| | 4 | H | L | L |
| | 5 | H | L | H |
| | 6 | H | H | L |
| | 7 | H | H | H |

OPTICAL SENSOR, OUTPUT PROCESSING METHOD OF OPTICAL SENSOR, DISPLAY DEVICE, AND ELECTRONIC APPARATUS

BACKGROUND OF THE INVENTION

1. Technical Field

The invention relates to a technology for reading out the output of a light-receiving element, such as a photodiode.

2. Related Art

In recent years, display panels in which liquid crystal elements or organic EL (electroluminescent) elements are arranged in a matrix in electronic apparatuses, such as cellular phones and PDAs (personal digital assistants) have been widely spread. Such a display panel is used in various environments from a bright state to a dark state. For this reason, when the brightness or image quality of a display element is uniform irrespective of external light, it is easy for a user to see a display screen in any environment. On the other hand, it is very difficult for the user to see the display screen in other environments. Therefore, in the display panel, it is required that the amount of external light be detected and that the brightness or image quality of a display image be controlled according to the detected result.

In the control of the display image, the light receiving element, such as a photodiode, is used for detecting the amount of light. However, when the light receiving element is separately provided from the display panel, problems arise in that a space for mounting the light receiving element in an electronic apparatus is needed, or it is required to form an opening for detecting external light outside of the electronic apparatus.

In order to solve the above-mentioned problems, a technology in which the light receiving element is formed by the same process as a thin film transistor (hereinafter, referred to as a 'TFT') for switching a pixel on the display panel and that the external light is detected from the display panel has been considered.

According to this technology, noise becomes mixed into an output line to thus deteriorate the detection precision of the amount of light. Therefore, there has been suggested a technology in which the noise generated in the output line is detected, the detected noise is inverted to be supplied to the output line, and the noise generated in the output line is corrected (see Japanese Unexamined Patent Application Publication No. 9-82931 (FIG. 1) which is an example of the related art).

However, according to the above-mentioned technologies, since the output signal is an analog signal, it is difficult to perform the subsequent processes. In order to solve this problem, the output of the light receiving element may be A/D converted, but it is not easy to constitute an A/D converter with TFTs. As a result, the A/D converter must be separately provided from the display panel, and thus, the external light cannot be detected by the display panel as is.

In addition, the display panel is used under various environments from a very bright state, as in sunlight (about, 100,000 lux), to a very dark state in which a color is seen (about, 10 lux). As a result, it is required that the detection range of the amount of received light in the optical sensor provided on the display panel be very wide.

SUMMARY

An advantage of the invention is that it provides an optical sensor capable of easily being formed on a substrate, such as a display panel and of displaying an output with a binary value, an output processing method of the optical sensor, a display device, and an electronic apparatus.

According to an aspect of the invention, there is provided an optical sensor including: a light receiving element in which a current corresponding to the amount of received light flows between one end and the other end thereof; a comparator which compares a voltage at the one end of the light receiving element with a predetermined threshold voltage to output a logical signal based on the comparison result; an initialization circuit which initializes the voltage at one end of the light receiving element to the threshold value or a voltage approximate to the threshold voltage before detecting the received light amount; and a voltage changing circuit which changes the voltage at the one end of the light receiving element by a predetermined voltage after completing the initialization. In the optical sensor, after changing the voltage by the voltage changing circuit, a period until the logical signal output from the comparator is logically inverted is expressed as a value corresponding to the amount of the received light. In this case, the voltage at the one end of the light receiving element is initialized to the threshold value of the comparator or the voltage approximate to the threshold voltage and is then changed by the predetermined voltage. After that, since the voltage at the one end of the light receiving element is changed by the current corresponding to the amount of the received light, the voltage reaches the threshold voltage of the comparator again. At this time, since the change of voltage corresponds to the current flowing through the light receiving element, the period until the voltage at one end of the light receiving element reaches the threshold voltage depends on the amount of the received light.

In the optical sensor, it is preferable that the comparator be an inverter circuit which logically inverts the voltage at the one end of the light receiving element using the threshold voltage as a boundary. In addition, it is preferable that the initialization circuit be a first switch which short-circuits between an input terminal and an output terminal of the inverter circuit to initialize the voltage at the one end of the light receiving element to the threshold value or a voltage approximate to the threshold voltage. In addition, the inverter circuit or switch may be composed of the TFTs.

In addition, in the optical sensor, it is preferable that, when the detection range of the amount of received light is wide, first, the voltage changing circuit select any one of a plurality of voltages as the predetermined voltage.

In addition, in the optical sensor, it is preferable that the voltage changing circuit include a capacitor element which has one end connected to the one end of the light receiving element and a second switch which applies a first voltage to the other end of the capacitor element before detecting the amount of the received light and which applies a second voltage different from the first voltage to the other end of the capacitor element after completing the initialization. The capacitor element can be formed in the same manufacturing process as the TFT, and the switch can be composed of the TFTs.

In addition, it is preferable that, when the detection range of the amount of the received light is wide, second, the voltage changing circuit select any one of a plurality of the capacitor elements. In addition, it is preferable that, when the voltage at the one end of the light receiving element does not reach the threshold voltage in a predetermined period after changing the voltage by the voltage changing circuit, the voltage changing circuit selects the capacitor element having smaller capacitance. With this configuration, the suitable adjustment of sensitivity can be performed according to the amount of the received light.

According to another aspect of the invention, there is provided a display device including: the above-mentioned optical sensor, a display panel which displays an image in the vicinity of the light receiving element; and a control circuit which controls a display image according to data indicating the selection state of the capacitor element (or the logical signal output from the comparator). According to a further aspect of the invention, there is provided an electronic apparatus having the above-mentioned display device.

In addition, the invention can provide an output processing method of the optical sensor in addition to the optical sensor.

BRIEF DESCRIPTION OF THE DRAWINGS

The invention will be described with reference to the accompanying drawings, wherein like numbers reference like elements, and wherein:

FIG. 12 is a diagram showing the outputs of control signals S1, S2 and S3 in the optical sensor;

DESCRIPTION OF THE EMBODIMENTS

Embodiments of the invention will now be described with reference to the accompanying drawings.

First Embodiment

Figure 1:
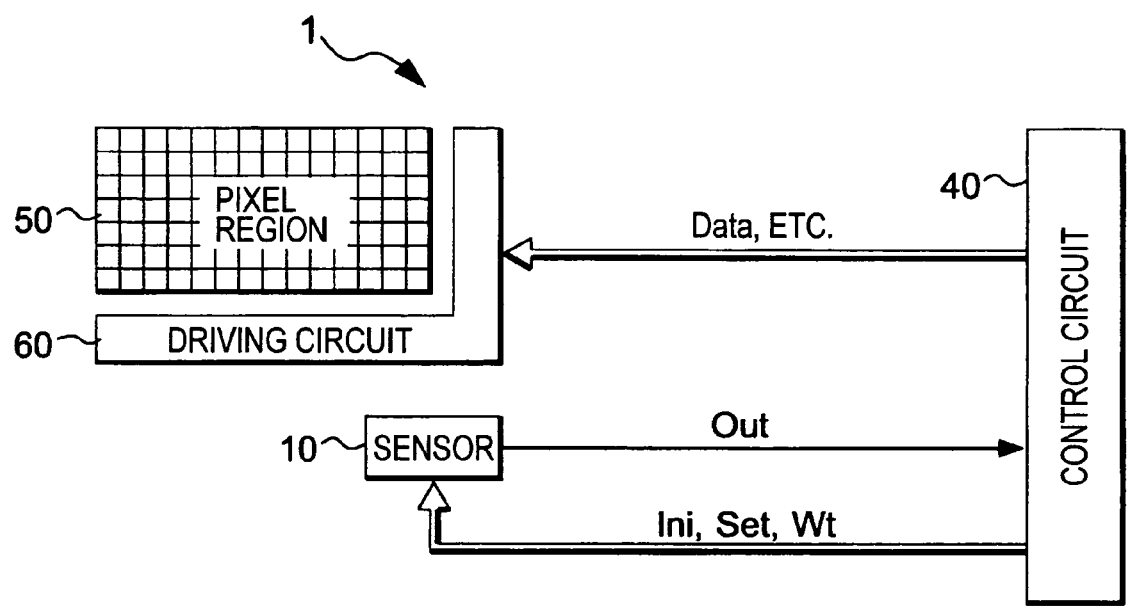
FIG. 1 is a block diagram showing the overall structure of a display panel to which an optical sensor according to a first embodiment of the invention is applied.

FIG. 1 is a block diagram showing the overall structure of a display panel including an optical sensor according to a first embodiment of the invention.

In FIG. 1, an optical sensor 10 outputs a signal Out according to the amount of received light, which will be described later in detail. According to the present embodiment, as the amount of the received light increases, the pulse width of the signal Out is narrowed.

Figure 2:
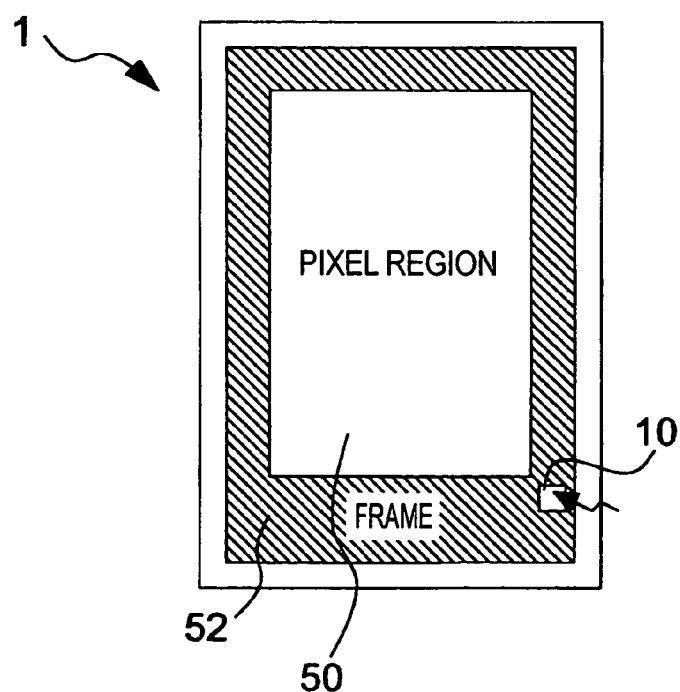
FIG. 2 is a plan view showing the structure of the display panel.

As shown in FIG. 2, the optical sensor 10 is provided right below a frame (light shielding layer) 52 which defines an outer circumference of a pixel region 50. In addition, a light receiving surface of the optical sensor 10 is located at a part of the frame 52 where an opening is formed.

In addition, the pixel region 50 is a region where a plurality of pixels is arranged in a matrix.

Assuming that the display panel 1 is a liquid crystal panel, the pixels are respectively arranged so as to correspond to intersections of scanning lines and data lines (not all of them are shown), as is well known. The display panel 1, which is the liquid crystal panel, is composed of TFTs which are respectively turned on between the data lines and pixel electrodes when the scanning lines are selected and a liquid crystal layer with liquid crystal interposed between the pixel electrode and a counter electrode (common electrode). However, the detailed description thereof will be omitted because it is not directly associated with the invention.

A control circuit 40 performs image processing on data Data indicating the gray-scale level of each pixel in the pixel region 50 according to the signal Out to supply it to a driving circuit 60 or adjusts the luminance of an auxiliary light source, such as a backlight (not shown), and supplies a control signal Ini to the optical sensor 10, which will be described in detail later. In addition, the control circuit 40 has a function for generating clock pulses and a function for counting the number of the clock pulses, which will be described below.

The driving circuit 60 is the general name for a circuit which drives the scanning lines and the data lines. Specifically, the driving circuit 60 includes a scanning line driving circuit which sequentially selects the scanning lines and a data line driving circuit which supplies data signals having voltages corresponding to the gray-scale levels to the pixels located along the selected scanning line via the data lines. However, the detailed description of the driving circuit 60 will be omitted because it is not directly associated with the invention.

Next, the specific structure of the optical sensor 10 will be described with reference to FIG. 3.

Figure 3:
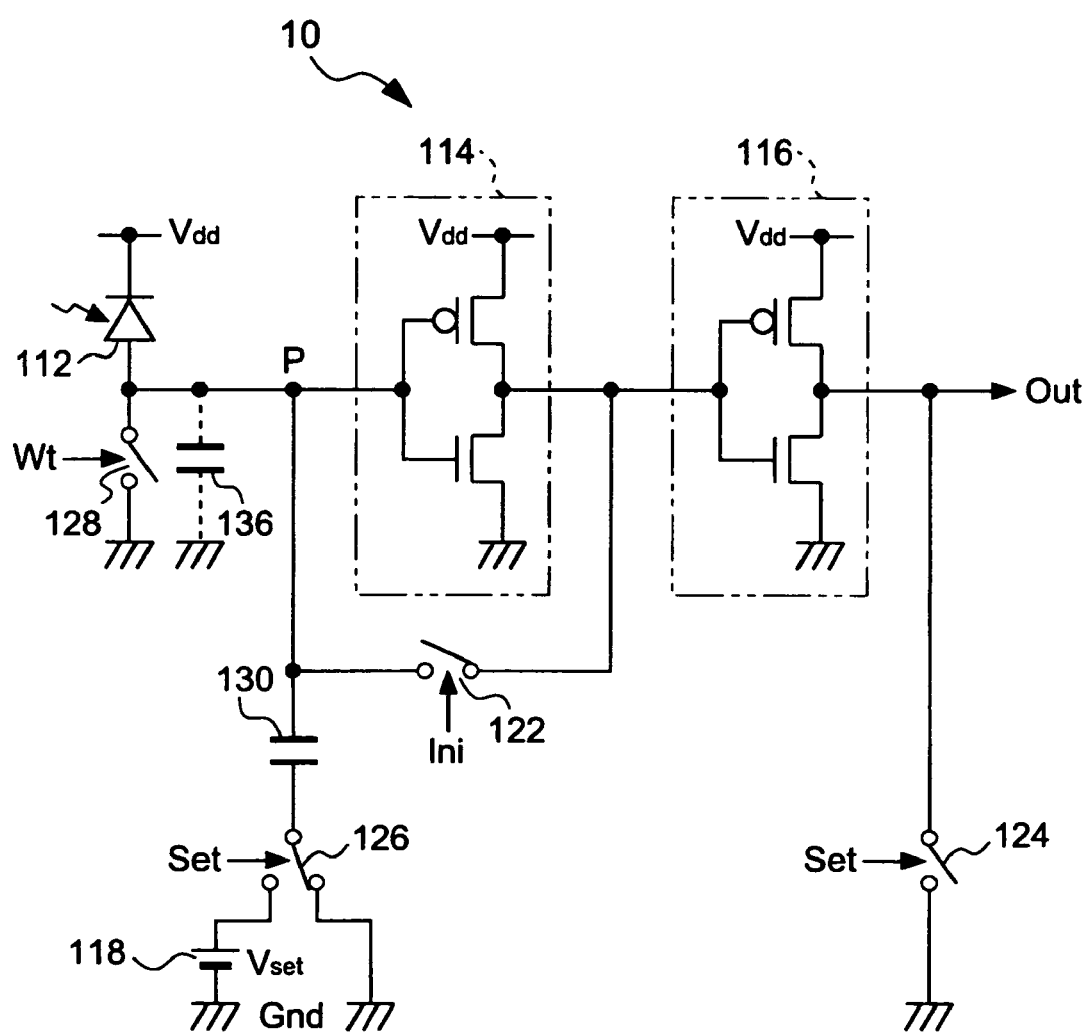
FIG. 3 is a diagram showing the structure of the optical sensor.

As shown in FIG. 3, a photodiode 112 has a cathode connected to a feeder line which is supplied with a high side voltage Vdd of a power supply and an anode respectively connected to an input terminal of an inverter circuit 114, one end of a switch 122, one end of a capacitor element 130, and one end of a switch 128. Here, as described above, the photo diode 112 is provided such that the light receiving surface thereof receives the light incident through the opening of the frame 52. The photodiode 112 is, for example, a PIN type and is formed in the same process as a pixel switching TFT.

The inverter circuit 114 has a complementary structure which is composed of a p-channel-type TFT and an n-channel-type TFT using a voltage (Vdd−Gnd) as a power supply voltage, and its common gate and common drain are an input terminal and an output terminal, respectively. The output terminal of the inverter circuit 114 is connected to an input terminal of an inverter circuit 116 having the same structure as the inverter circuit 114. In addition, the signal Out is output from an output terminal of the inverter circuit 116.

The output terminal of the inverter circuit 116 is also connected to one end of a switch 124. The other end of the switch 124 is connected to a ground potential Gnd (zero voltage) functioning as a reference voltage. The switch 124 is turned on only when a control signal Set supplied from the control circuit 40 (see FIG. 1) is at an H level.

Through the switch 124, the voltage level of the signal Out is determined by the voltage of the input terminal of the inverter circuit 116 (the input terminal of the inverter circuit 114) when the control signal Set is an L level, and becomes an L level compulsorily irrespective of the voltage of the input terminal of the inverter circuit 116 when the control signal Set is an H level.

On the other hand, the output terminal of the inverter circuit 114 is connected to the other end of the switch 122, in addition to being connected to the input terminal of the inverter circuit 116. Here, the switch 122 is turned on when the control signal Ini supplied from the control circuit 40 becomes an H level and is turned off when the control signal Ini becomes an L level.

In addition, the other terminal of a capacitor element 130 is connected to a common output terminal of the switch 126. Here, the switch 126 functioning as a double-throw switch is connected to the ground potential Gnd side terminal shown by a solid line in FIG. 3 when the control signal Set is the L level, and is connected to a positive pole terminal of a reference voltage source 118 for supplying a voltage Vset when the control signal Set is an H level. In addition, a negative pole terminal of the reference voltage source 118 is connected to the ground potential Gnd.

In addition, the other end of the switch 128 is connected to the ground potential Gnd. The switch 128 is turned on only when a control signal Wt supplied from the control circuit 40 is an H level.

For the convenience of explanation, the anode of the photodiode 112 (the input terminal of the inverter circuit 114, and one end of each of the switches 122 and 128 and the capacitor element 130) is referred to as a node P. As described above, since the optical sensor 10 is formed in the display panel 1, a large capacitance, especially, a gate capacitance of the inverter circuit 114 is parasitic on the node P. Therefore, the parasitic capacitance is denoted by reference numeral 136 in FIG. 3.

Next, the operation of the optical sensor 10 will be described with reference to FIGS. 4 to 9.

Figure 4:
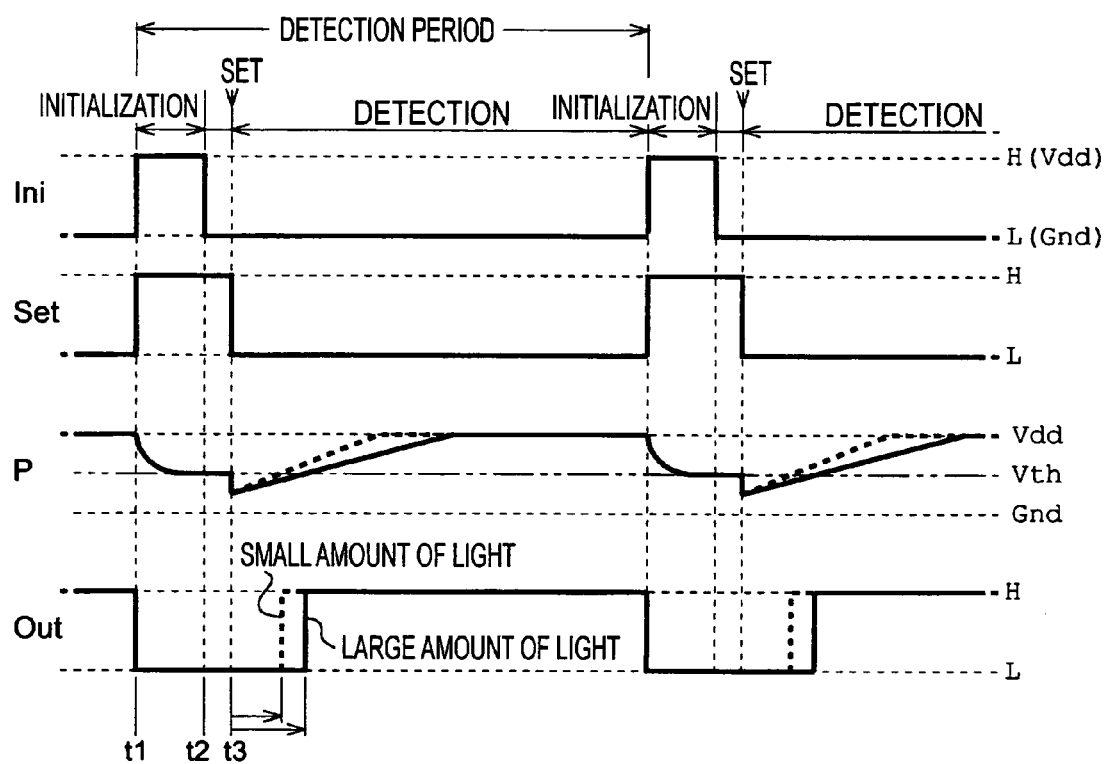
FIG. 4 is a voltage waveform diagram of each unit for describing the operation of the optical sensor.
Figure 5:
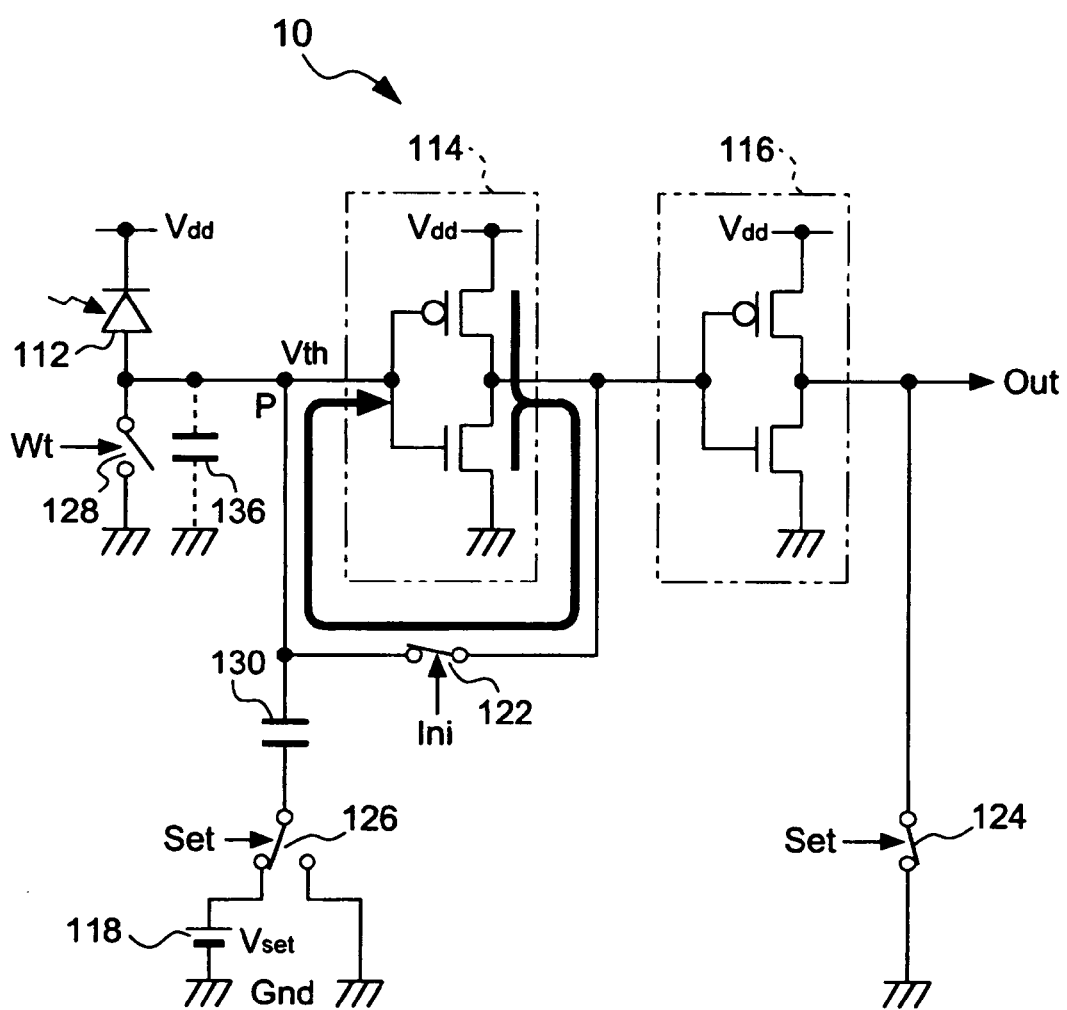
FIG. 5 is a diagram showing the operation of the optical sensor.

As shown in FIG. 4, first, the control circuit 40 initializes the control signals Ini and Set at a timing t1 so as to become an H level. Since the control signal Ini becomes an H level so that the switch 122 is turned on, the input terminal and output terminal of the inverter circuit 114 are short-circuited, as shown in FIG. 5. Therefore, the node P has a voltage obtained by halving the voltage (Vdd−Gnd), that is, a threshold voltage Vth of the inverter circuit 114. As a result, immediately before an initialization period, the voltage held by the parasitic capacitance 136 is initialized with the threshold voltage Vth.

In addition, the output voltage of the inverter circuit 114 becomes the threshold voltage Vth by turning on the switch 122. However, since the control signal Set becomes an H level in the initialization period, the switch 124 is turned on, so that the output signal Out is decided to the ground potential Gnd corresponding to the L level.

On the other hand, the control signal Set becomes an H level, so that the switch 126 is connected to the positive pole terminal of the reference voltage source 118. Therefore, the voltage Vset is applied to the other end of the capacitor element 130.

In addition, in FIG. 4, a signal waveform is not shown. However, when the amount of light is detected, the control circuit 40 makes the control signal Wt have an L level, so that the switch 128 is turned off.

Figure 6:
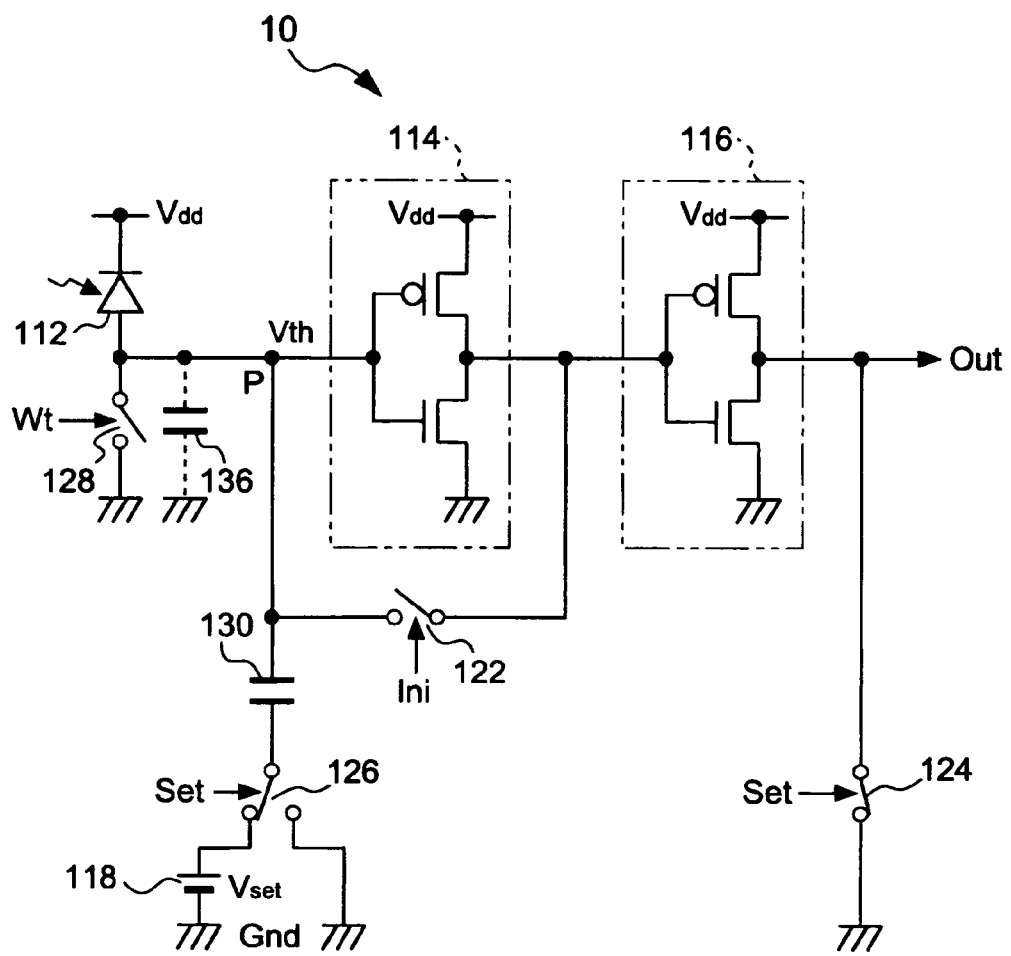
FIG. 6 is a diagram showing the operation of the optical sensor.

Next, as shown in FIG. 4, the control circuit 40 changes the voltage level of the control signal Ini to an L level at a timing t2 and maintains the control signal Set to an H level. As a result, as shown in FIG. 6, the switch 122 is turned off. Since the other end of the capacitor element 130 is maintained to the voltage Vset, the node P is maintained to the threshold value Vth in initialization by the capacitor element 130 and the parasitic capacitance 136.

Figure 7:
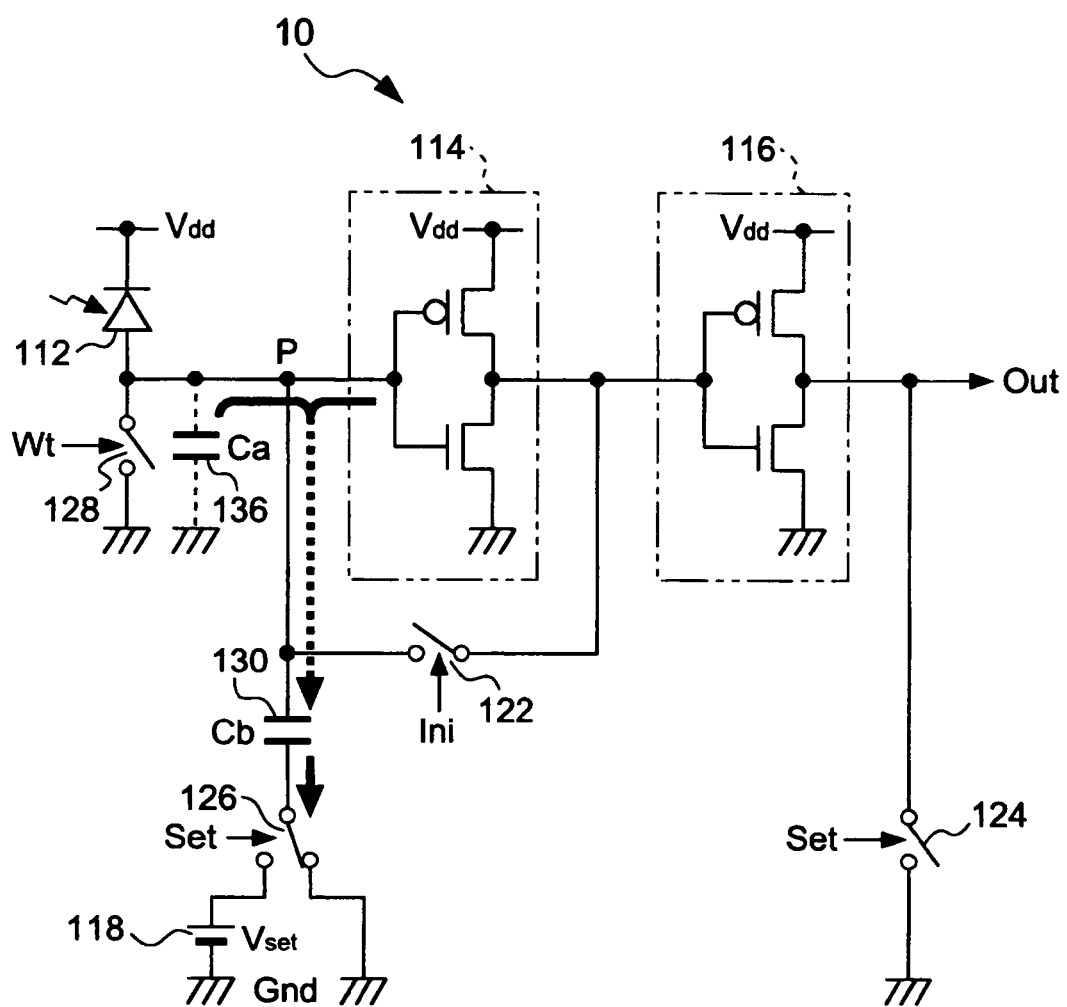
FIG. 7 is a diagram showing the operation of the optical sensor.

Subsequently, the control circuit 40 changes the level of the control signal Set to an L level at a timing t3, as shown in FIG. 4. As a result, since the switch 124 is turned off, the logical level of the signal Out depends on the voltage at the node P, as shown in FIG. 7.

The voltage at the node P will now described. First, the control signal Set becomes an L level, so that the switch 126 is connected to the ground potential Gnd, as shown in FIG. 7. As a result, the voltage at the other end of the capacitor element 130 drops from the voltage Vset to the ground potential Gnd.

Here, since the switch 122 has been already turned off, the node P reduces a voltage drop amount at the other end of the capacitor element 130 by the voltage divided according to a capacitance ratio of the capacitor element 130 to the parasitic capacitance 136. Specifically, since the voltage drop amount at the other end of the capacitor element 130 is (Vset−Gnd), the voltage at the node P is reduced from the threshold value Vth by (Vset−Gnd)·Ca/(Ca+Cb). In addition, reference characters Ca and Cb indicate the capacitance values of the parasitic capacitance 136 and the capacitor element 130, respectively.

Therefore, the voltage at the node P must be smaller than the threshold value Vth right after the voltage level of the control signal Set is changed to an L level.

In the initialization period, at a point of time when the control signal Set becomes an H level, the level of the output signal Out is changed to an L level, and the voltage at the node P is smaller than the threshold value Vth right after the level of the control signal Set returns to an L level. Therefore, the output signal Out is maintained to an L level right after the timing t3.

Figure 8:
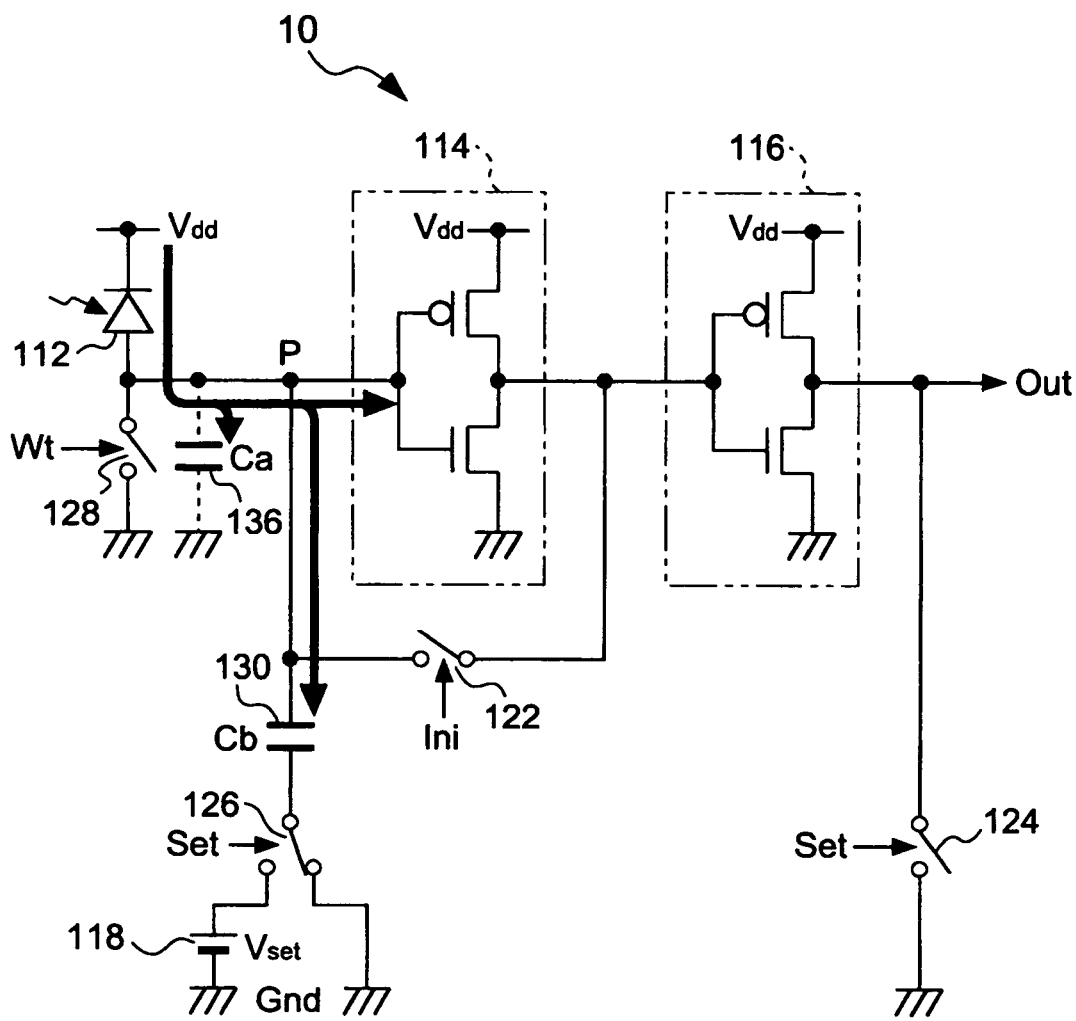
FIG. 8 is a diagram showing the operation of the optical sensor.

On the other hand, as shown in FIG. 8, the current according to the amount of received light flows through the photodiode 112 while charging the capacitor element 130 and the parasitic capacitance 136. As a result, the voltage at the node P increases from the voltage after the voltage drop occurs to the voltage Vdd.

In addition, strictly speaking, at a point of time when the control signal Ini becomes an L level to turn off the switch 122, the voltage at the node P starts increasing. However, since a period in which only the control signal Set becomes an H level is set to have a negligible short time, the node P may be held to the threshold voltage Vth in the period.

When the voltage at the node P increases to exceed the threshold voltage Vth of the inverter circuit 114, the voltage level of the output terminal of the inverter circuit 114 becomes an L level, and the voltage level is inverted by an inverter circuit 116 again. As a result, the signal Out becomes an H level.

At this time, with the increase of the amount of received light, the current passing through the photodiode 112 increases. Therefore, a voltage build-up rate of the node P increases. As a result, a period of time from the timing t3 to the timing when the level of the signal Out is changed to an H level becomes shorter.

Since the voltage drop of the node P at the timing t3 is determined by the voltage Vset and the capacitance ratio, the period of time from the timing t3 to the timing when the level of the signal Out is changed to the H level depends on the amount of light incident on the photodiode 112.

Therefore, the control circuit 40 can count the number of clock pulses included in a period of time until the level of the signal Out is changed to the H level after changing the level of the control signal Set to an L level and obtain information on the amount of light incident on the photodiode 112 through the structure which calculates the counted result.

In addition, the control circuit 40 performs an image process with respect to the data Data in a display panel 1 or adjusts the luminance of an auxiliary light source, such as a backlight, based on the information on the amount of the received light, thereby executing the proper control of a display screen according to usage environments.

In addition, since the level of the signal Out is changed to an L level at the timing t1 when the control signal Set becomes an H level, in the case in which a period of time from the timing t1 to the timing t3 when the control signal Set becomes the H level is assumed as a constant period of time (or a well-known period of time), it is possible to treat a pulse width in which the signal Out becomes an L level as the value corresponding to the amount of light incident on the photodiode 112.

Figure 9:
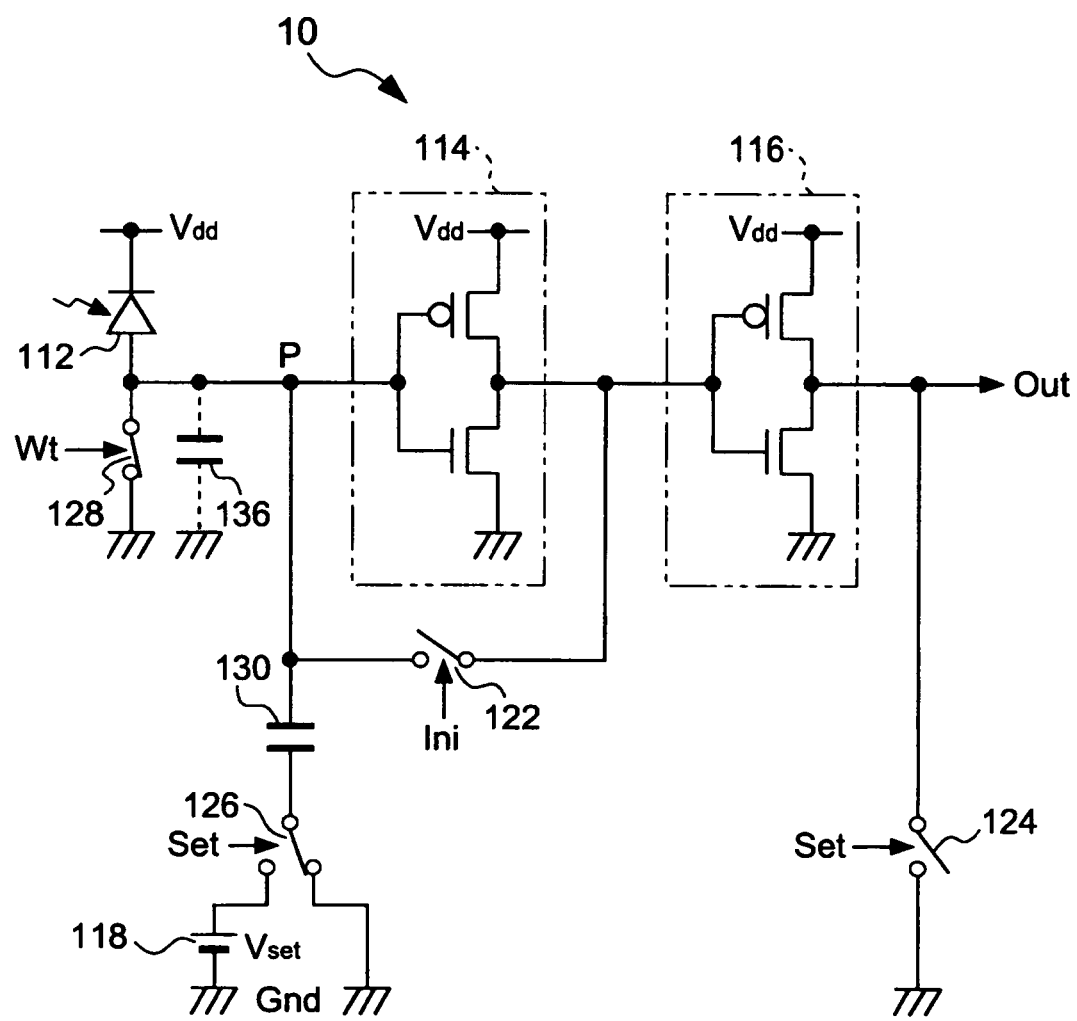
FIG. 9 is a diagram showing the operation of the optical sensor.

In addition, when the light amount may not be detected by the optical sensor 10, for example, in a standby mode, the control circuit 40 makes only the control signal wt have an H level. As shown in FIG. 9, when the control signal wt becomes the H level, the switch 128 is turned on. Therefore, since the voltage at the node P is fixed to the ground potential Gnd. As a result, it is possible to suppress the power consumed through the switching operation by TFTs of the inverter circuits 114 and 116.

Among the constituent elements of the optical sensor 10, the inverter circuits 114 and 116 and the switches 122, 124, 126, and 128 all may be composed of TFTs. In addition, the capacitor element 130 can be formed using the same manufacturing process as the TFT. For example, the capacitor element 130 can have a laminated structure of a semiconductor layer having low resistance, a thermally oxidized film, and a conductive layer. In addition, the photodiode 112 is manufactured by the same manufacturing process as the TFT as described above.

Therefore, in the display panel 1, the constituent elements can be formed on the same substrate using a process in common to the pixel region 50.

In addition, according to the present embodiment, without converting the analog value of the current (or voltage) corresponding to the amount of received light into a digital value to display it, the amount of received light is changed to a voltage change amount, and the voltage change amount is calculated as a period of time until the level of the signal Out is changed to a high level from the timing t3, which is shown in a binary value. As a result, since it is not necessary that an A/D converter be provided, the simple structure can be achieved.

In addition, as shown in FIG. 4, the detection of the light amount by the optical sensor 10 is carried out in a predetermined period, and thus it is possible to repeatedly perform the proper control coping with a variation of circumferences.

According to the above-mentioned embodiment, the voltage at the node P is initialized to the threshold voltage Vth in the initialization period. However, the voltage at the node P is initialized to a voltage approximate to the threshold value. After all, the voltage at the node P may exceed the threshold voltage Vth again after the timing t3. In addition, the voltage at the node P may increase at the timing t3 and then may decrease according to the amount of received light.

Figure 10:
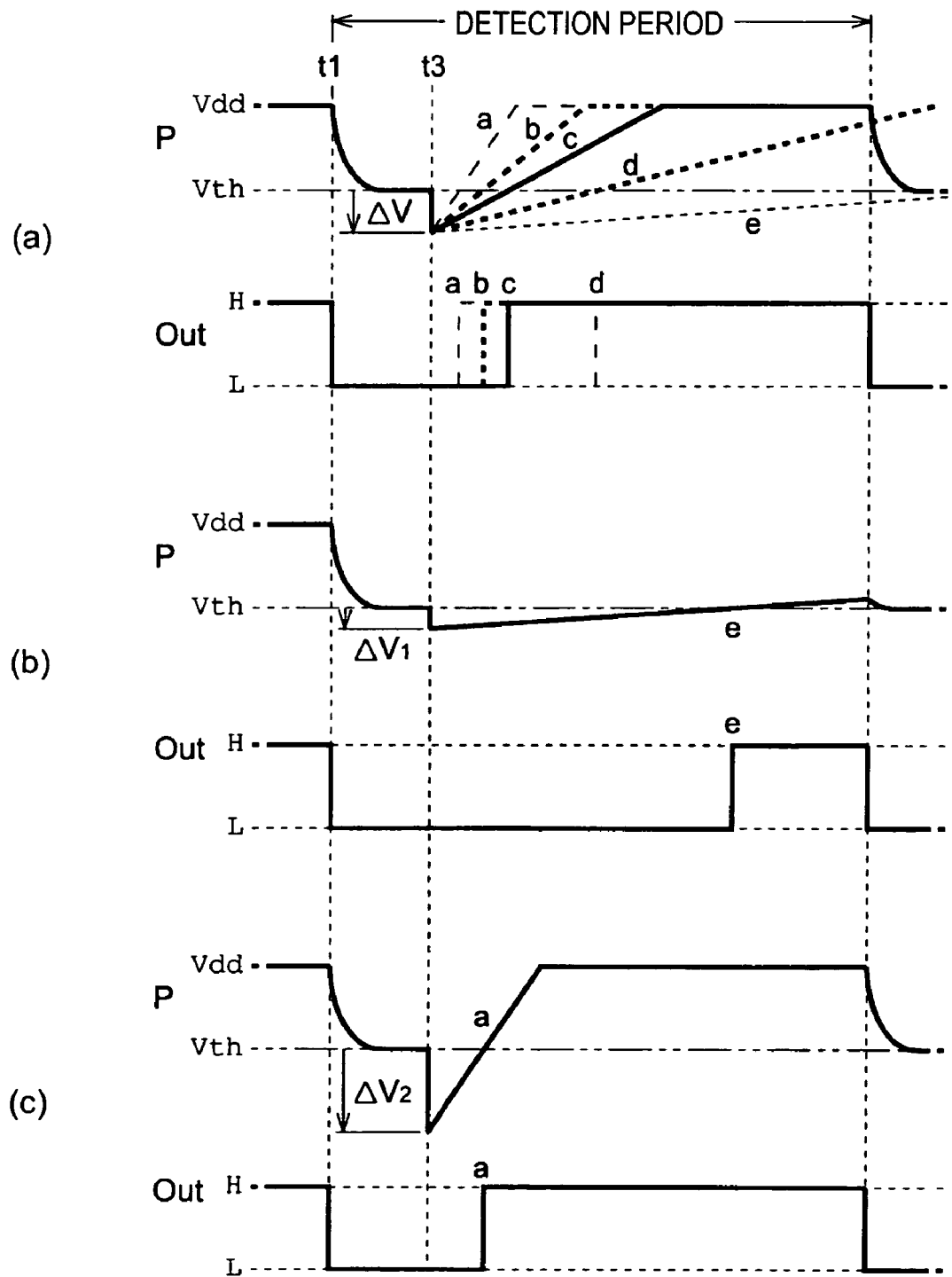
FIG. 10 is a voltage waveform diagram of each unit for describing the operation of the optical sensor.

On the other hand, as shown in FIG. 10A, according to the first embodiment, the voltage at the node P is dropped by a voltage $\Delta V$ at the timing t3, and then the voltage drop is alleviated in the order of a→b→c→d→e when the amount of light incident on the photodiode 112 decreases.

Therefore, when the amount of received light is very small, for example, in the case of the line shown by a reference character 'e' in FIG. 10A, in the detection period, the voltage at the node P does not exceed the threshold voltage Vth. As a result, it is difficult to obtain information on the amount of received light.

To the contrary, when the amount of received light is very large, for example, in the case of the line shown by a reference character 'a' in FIG. 10A, the voltage at the node P immediately exceeds the threshold value Vth right after the timing t3. In this case, if a period of time from the timing t3 to the timing when the voltage at the node P exceeds the threshold value Vth is shorter than a clock pulse cycle, it is difficult to obtain the information on the amount of received light.

As a countermeasure to solve a problem in that it is difficult to obtain the information on the amount of received light, it is considered the structure in which the reference voltage source 118 generates a plurality of voltages as the voltage Vset and the control circuit 40 selects any one of the plurality of voltages according to the state of the signal Out. Specifically, in the case in which the amount of received light is extremely small and thus the level of the signal Out becomes an L level when the detection period is completed, the control circuit 40 selects a lower voltage by one stage as the voltage Vset. On the other hand, in the case in which the amount of received light is extremely large and thus the voltage at the node P exceeds the threshold voltage Vth right after the timing t3, and in which, as the result of count, the number of the clock pulses is zero, the control circuit 40 selects a higher voltage by one stage as the voltage Vset.

As described above, the voltage drop amount at the node P at the timing t3 is a value obtained by dividing the voltage drop amount at the other end of the capacitor element 130 according to the capacitance ratio of the capacitor element 130 to the parasitic capacitance 136. Therefore, the structure in which the voltage Vset is selected from the plurality of voltages and the voltage is changed is the same as the structure in which the voltage drop amount is selected from the plurality of voltages at the other end of the capacitor element 130.

As shown in FIG. 10B, when the lower voltage by one stage is selected as the voltage Vset, the voltage drop amount at the node P at the timing t3 becomes $\Delta V_1$, which is smaller than $\Delta V$. As a result, in the case in which the voltage rising at the node P after the timing t3 is alleviated because the amount of received light is small, the voltage at the node P can exceed the threshold voltage Vth in the detection period.

In addition, as shown in FIG. 10C, when the higher voltage by one stage is selected as the voltage Vset, the voltage drop amount at the node P at the timing t3 becomes $\Delta V_2$, which is greater than $\Delta V$. As a result, in the case in which the voltage at the node P after the timing t3 rapidly increases because the amount of received light is large, in the detection period, it is possible to delay the timing when the voltage at the node P exceeds the threshold voltage Vth. Therefore, it is possible to make the counted result of the number of the clock pulses included in the period of time from the timing t3 to the timing when the signal Out becomes an H level greater than zero.

According to the above-mentioned structure, the period of time from the timing t3 to the timing when the signal Out becomes the H level and the information indicating which voltage is selected from the plurality of voltages as the voltage Vset become information on the amount of received light.

Second Embodiment

On the other hand, as described above, in the structure in which any one of the plurality of voltages is selected as the voltage Vset according to the state of the signal Out, a plurality of different voltages must be previously prepared, and it must be considered that the structure of the power supply circuit (voltage generating circuit) (not shown) becomes complicated. Therefore, the optical sensor using one kind of voltage Vset while preventing the information according to the received light amount from not being obtained will be described with reference to a second embodiment.

Figure 11:
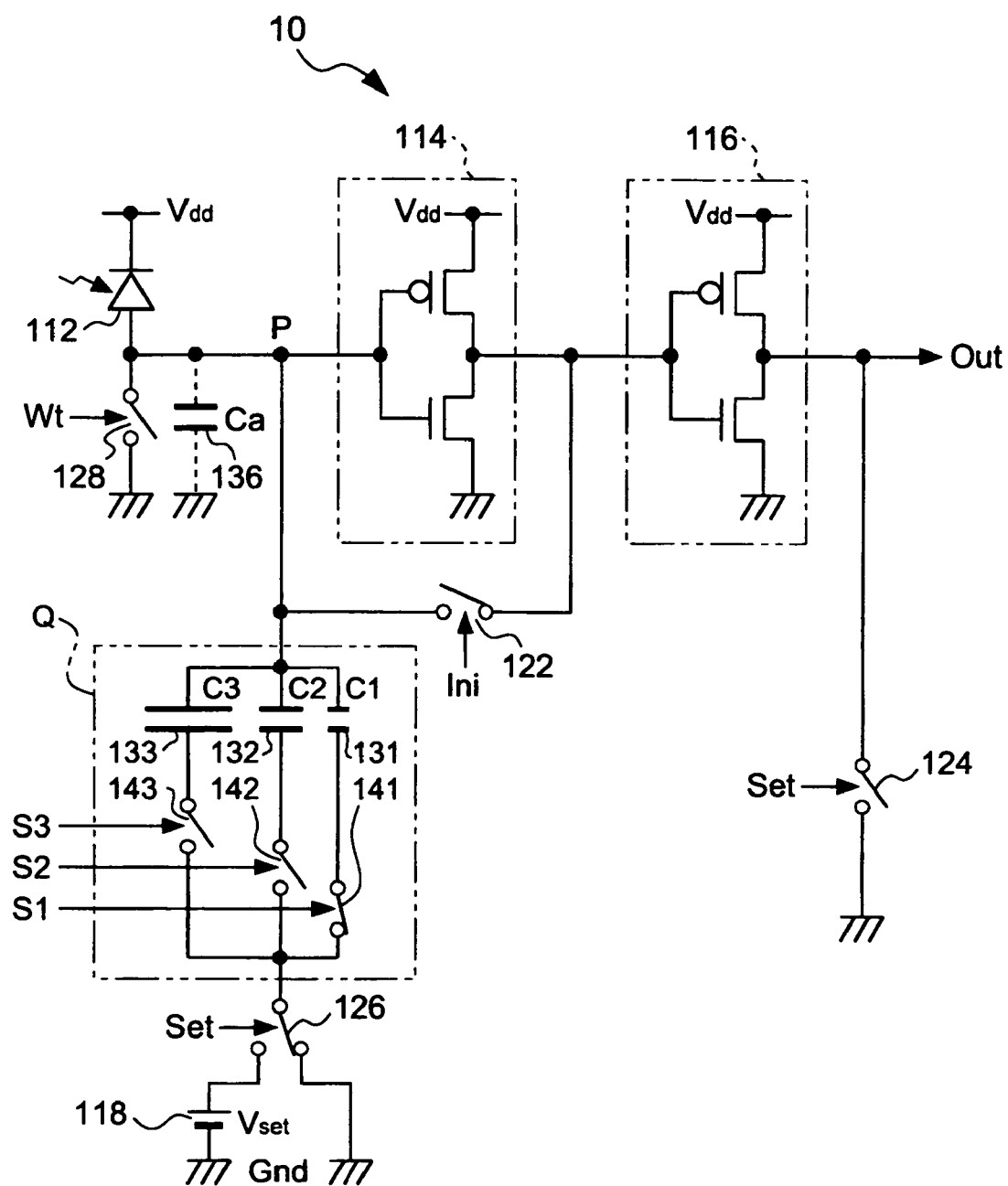
FIG. 11 is a diagram showing the structure of an optical sensor according to a second embodiment of the invention.

FIG. 11 is a diagram showing the structure of an optical sensor 10 according to the second embodiment of the invention.

The optical sensor 10 according to the second embodiment shown in FIG. 11 is the same structure as that in the first embodiment, except that the capacitor element 130 shown in FIG. 3 is replaced with a portion shown by a region Q. Therefore, only the different structure will be described.

In the region Q, each of capacitor elements 131, 132, and 133 has one end commonly connected to a node P. When the capacitances of the capacitor elements 131, 132, and 133 are referred to as C1, C2, and C3, respectively, a capacitance ratio thereof is 1:2:4.

The other end of each of the capacitor elements 131, 132, and 133 is connected to one end of each of switches 141, 142, and 143. In addition, the other end of each of the switches 141, 142, and 143 is commonly connected to one end of a switch 126.

Here, the switches 141, 142, and 143 are turned on when control signals S1, S2 and S3 supplied from a control circuit 40 are H levels, and are turned off when they are L levels.

In the second embodiment, the control circuit 40 determines the output states of the control signals S1, S2, and S3 with reference to the contents shown in FIG. 12 as follows. That is, when the signal Out is an L level in the completion of a detection period, the control circuit 40 changes the current output state to a lower state by one stage (the upper direction in FIG. 12) and reduces the capacitance of the capacitor element. In addition, when the counted result of the number of clock pulses is zero (or when lower than the threshold value separately set), the control circuit 40 changes the current output state to a higher state by one stage (the lower direction in FIG. 12) and increases the capacitance of the capacitor element.

According to this structure, the signals S1, S2, and S3 can used as information indicating the range of the amount of received light, and a period of time from the timing t3 to the timing when the signal Out becomes an H level can be used as information indicating what degree of value is shown in the range. That is, all data which constitutes the signals S1, S2, and S3 as a high-order bit and constitutes, as a low-order bit, the information indicating the period of time from the timing t3 to the timing when the signal Out becomes the H level (for example, the counted result) can be used as information indicating the amount of received light. Therefore, when the minute detection precision is not required, only the signals S1, S2, and S3 may be used as the information indicating the amount of received light in controlling the display panel 1.

According to the first embodiment, the voltage drop amount at the node P at the timing t3 is expressed by (Vset−Gnd)·Ca/(Ca+Cb). However, according to the second embodiment, since the capacitance Ca used as a capacitor element increases or decreases according to the states of the control signals S1, S2, and S3, the voltage drop amount at the node P can be controlled with the voltage Vset maintained in a constant state.

In addition, according to the second embodiment, by the increase or decrease of the capacitance Ca, the voltage build-up rate after the timing t3 is changed. Specifically, when the current corresponding to the amount of received light flows through the photodiode 112, the corresponding current charges the parasitic capacitor 136 and a synthesized capacitance corresponding to the capacitor element that the control signals S1, S2, and S3 becomes an H level among the capacitor elements 131, 132, and 133. As a result, when the synthesized capacitance decreases, the voltage build-up rate where the voltage at the node P increases from the threshold voltage Vth increases. On the other hand, when the synthesized capacitance increases, the voltage build-up rate where the voltage at the node P increases from the threshold voltage Vth decreases.

Therefore, according to the second embodiment, when the amount of received light is small, the voltage drop amount at the node P at the timing t3 decreases, and the operation for increasing the voltage build-up rate at the node P after the timing t3 is performed. To the contrary, when the amount of received light is large, the voltage drop amount at the node P at the timing t3 increases, and the operation for decreasing the voltage build-up rate at the node P after the timing t3 is performed.

As a result, although the detection range of the amount of received light is exponentially widened, according to the second embodiment, the amount of received light can be suitably detected.

In addition, when all the signals S1, S2, and S3 are L levels, the capacitance becomes zero, and the voltage at the node P at the timing t3 decreases from the threshold voltage Vth. Therefore, in FIG. 12, the state in which all the signals S1, S2, and S3 are the L levels is excluded.

Electronic Apparatus

Next, an example in which the electro-optical device according to the above-mentioned embodiments is used for an electronic apparatus will be described.

Figure 13:
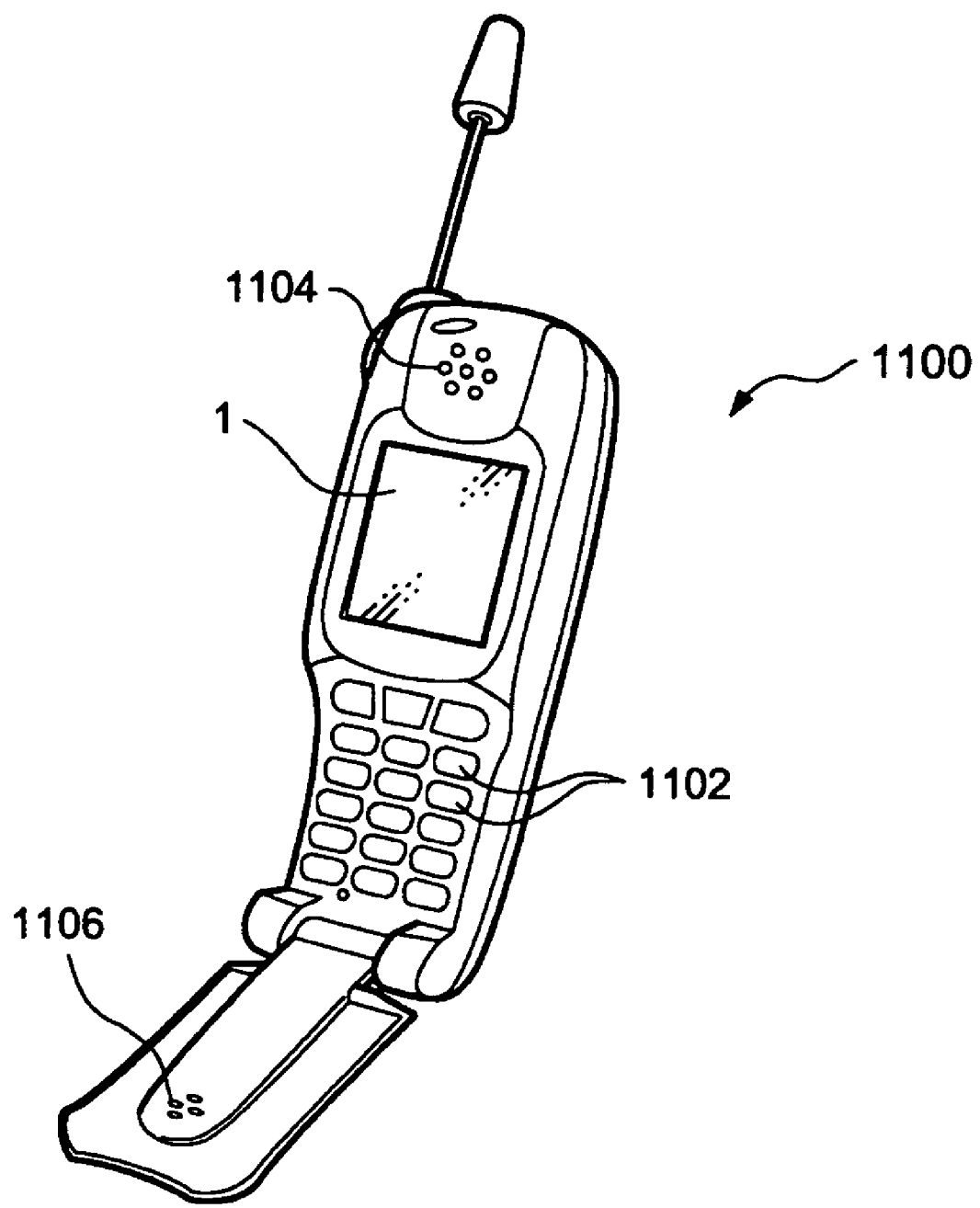
FIG. 13 is a diagram showing a cellular phone having a display panel to which an optical sensor is applied.

FIG. 13 is a perspective view showing the structure of a cellular phone in which the above-mentioned display panel 1 is used as a display unit.

In FIG. 13, a cellular phone 1100 includes a plurality of operation buttons 1102, an earpiece 1104, a mouthpiece 1106, and the display panel 1 which functions as a display unit and has the above-mentioned optical sensor 10.

According to this configuration, since the optical sensor 10 is provided in the display panel 1, an additional opening and a mounting space for a light receiving element are not necessary. In addition, it is possible to more accurately detect the amount of received light. In addition, it is possible to more properly control a display image based on the amount of received light.

Next, a digital still camera using the above-mentioned display panel 1 as a finder (a built-in monitor) will be described.

Figure 14:
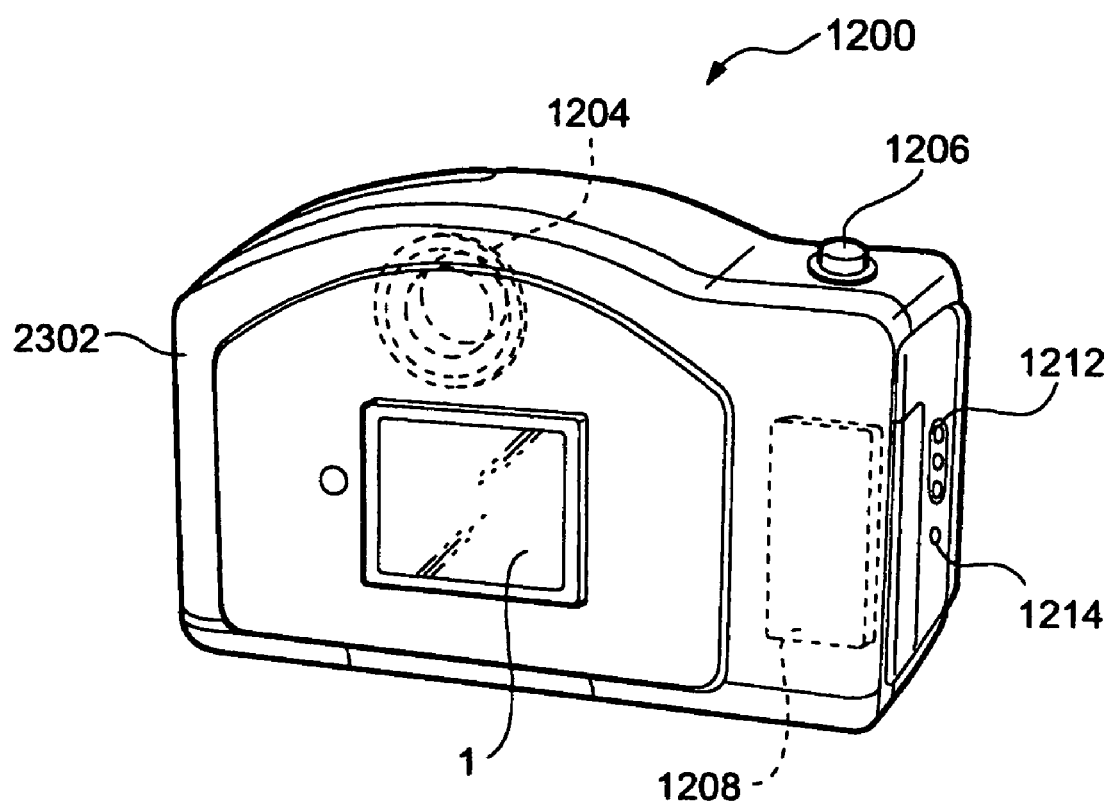
FIG. 14 is a diagram showing a digital still camera having a display panel to which the optical sensor is applied.

FIG. 14 is a perspective view showing a rear surface of the digital still camera. In a film camera, a film is exposed to light by an optical image of a subject. On the other hand, in a digital still camera 1200, the optical image of the subject is photoelectrically converted by an imaging device, such as a CCD (charge coupled device), and an image signal is generated to be stored. The above-mentioned display panel 1 is provided on the rear surface of a case 1202 of the digital still camera 1200. Since the display panel 1 performs display based on the image signals, it can function as a finder for displaying a subject. In addition, a light receiving unit 1204 including an optical lens or the CCD is provided on the front surface of the case 1202 (back surface side in FIG. 14).

When a photographer confirms the image of a subject displayed on the display panel 1 and pushes a shutter button

1206, the signals of the image captured at this point by the CCD is transmitted to and stored in a memory of a circuit substrate 1208. In addition, in the digital still camera 1200, a video signal output terminal 1212 for performing external display and an input/output terminal 1214 for data communication are provided at a side of the case 1202.

In addition, the electronic apparatuses may include a television, a view-finder-type and monitor-direct-view-type videotape recorder, a car navigation apparatus, a pager, an electronic organizer, a calculator, a word processor, a workstation, a video phone, a POS terminal, and apparatuses having a touch panel as well as the cellular phone of FIG. 13 and the digital still camera of FIG. 14. In addition, it is needless to say that the above-mentioned display panel 1 can be applied to the display units of these various electronic apparatuses.

In addition, according to the above-mentioned embodiments, the liquid crystal panel is used as the display panel 1. However, the display panel of the invention can be applied to different display panels which use, for example, light emitting elements, such as an organic EL element, an inorganic EL element, a field emission (FE) element, and a LED, an electrophoresis element, and an electrochromic element.

In addition, the invention is not limited to the display panel which directly displays an image or character, but may be applied to a light source of a printing apparatus which is used for indirectly forming an image or character by emitting light onto a photoreceptor, that is, a line head of an LED printer.

In addition, a configuration in which the pixel region 50 is divided into a plurality of sub-pixel regions, the optical sensor 10 is provided so as to correspond to each sub-pixel region, and the image of the corresponding sub-pixel region is controlled according to each detected result may be used.

What is claimed is:

1. An optical sensor comprising:
   a light receiving element in which a current corresponding to the amount of received light flows between one end and the other end thereof;
   a comparator which compares a voltage at the one end of the light receiving element with a predetermined threshold voltage to output a logical signal based on the comparison result;
   an initialization circuit which initializes the voltage at the one end of the light receiving element to the predetermined threshold voltage or a voltage approximate to the threshold voltage before detecting the amount of the received light, the predetermined threshold voltage or a voltage approximate to the threshold voltage being derived from the comparator; and
   a voltage changing circuit which changes the voltage at the one end of the light receiving element by a predetermined voltage after completing the initialization,
   wherein, after changing the voltage by the voltage changing circuit, a period until the logical signal output from the comparator is logically inverted is expressed as a value corresponding to the amount of the received light.

2. The optical sensor according to claim 1,
   wherein the comparator is an inverter circuit which logically inverts the voltage at the one end of the light receiving element using the threshold voltage as a boundary.

3. The optical sensor according to claim 2,
   wherein the initialization circuit is a first switch which short-circuits between an input terminal and an output terminal of the inverter circuit to initialize the voltage at the one end of the light receiving element to the threshold value or a voltage approximate to the threshold voltage.

4. The optical sensor according to claim 1,
   wherein the voltage changing circuit selects any one of a plurality of voltages as the predetermined voltage.

5. The optical sensor according to claim 1,
   wherein the voltage changing circuit includes:
   a capacitor element which has one end connected to the one end of the light receiving element; and
   a second switch which applies a first voltage to the other end of the capacitor element before detecting the amount of the received light and which applies a second voltage different from the first voltage to the other end of the capacitor element after completing the initialization.

6. The optical sensor according to claim 5,
   wherein the voltage changing circuit selects any one of a plurality of the capacitor elements.

7. The optical sensor according to claim 6,
   wherein, when the voltage at the one end of the light receiving element does not reach the threshold voltage in a predetermined period after changing the voltage by the voltage changing circuit, the voltage changing circuit selects the capacitor element having smaller capacitance.

8. A display device comprising:
   the optical sensor according to claim 7;
   a display panel which displays an image in the vicinity of the light receiving element; and
   a control circuit which inputs data indicating a selection state of the capacitor element to control a display image according to the data.

9. A display device comprising:
   the optical sensor according to claim 1;
   a display panel which displays an image in the vicinity of the light receiving element; and
   a control circuit which controls a display image according to the logical signal output from the comparator.

10. An electronic apparatus comprising the display device according to claim 8.

11. An output processing method of an optical sensor including a light receiving element in which a current corresponding to the amount of received light flows between one end and the other end thereof and a comparator which compares a voltage at the one end of the light receiving element with a predetermined threshold voltage to output a logical signal based on the comparison result, the method comprising:
   initializing the voltage at the one end of the light receiving element to the predetermined threshold voltage or a voltage approximate to the threshold voltage before detecting the amount of the received light, the predetermined threshold voltage or a voltage approximate to the threshold voltage being derived from the comparator;
   changing the voltage at the one end of the light receiving element by a predetermined voltage after completing the initializing; and
   expressing a period until the logical signal output from the comparator is logically inverted as a value corresponding to the amount of received light after changing the voltage by the voltage changing circuit.

* * * * *